United States Patent [19]
Gabrys

[11] 4,111,633
[45] Sep. 5, 1978

[54] MECHANISM FOR OPENING THE MOLDING DIES OF AN INJECTION MOLDING MACHINE

[75] Inventor: Kenneth F. Gabrys, Streamwood, Ill.

[73] Assignee: The Pentaject Corporation, Algonquin, Ill.

[21] Appl. No.: 822,732

[22] Filed: Aug. 8, 1977

[51] Int. Cl.² .................. B30B 9/28; B30B 11/08; B29G 3/08
[52] U.S. Cl. .................. 425/451; 425/233; 425/346
[58] Field of Search .............. 425/233, 236, 346, 411, 425/451, 595

[56] References Cited

U.S. PATENT DOCUMENTS

| | | | |
|---|---|---|---|
| 3,128,501 | 4/1964 | Borak | 425/411 X |
| 3,621,533 | 11/1971 | Bertrandi | 425/595 X |
| 3,746,491 | 7/1973 | Daly et al. | 425/233 |
| 3,824,062 | 7/1974 | Farrell | 425/451 |

Primary Examiner—J. Howard Flint, Jr.
Attorney, Agent, or Firm—Leydig, Voit, Osann, Mayer & Holt, Ltd.

[57] ABSTRACT

Molding units each having upper and lower molds are indexed through an injection station and then into an opening station. At the opening station, the lower mold of each unit first is opened and then is closed relative to the upper mold, the opening and closing of the lower mold being effected by an hydraulically actuated puller block adapted to be moved between raised and lowered positions. A shiftable yoke holds the puller block in a precisely established intermediate position while the molding units are being indexed into and out of the opening station.

5 Claims, 9 Drawing Figures

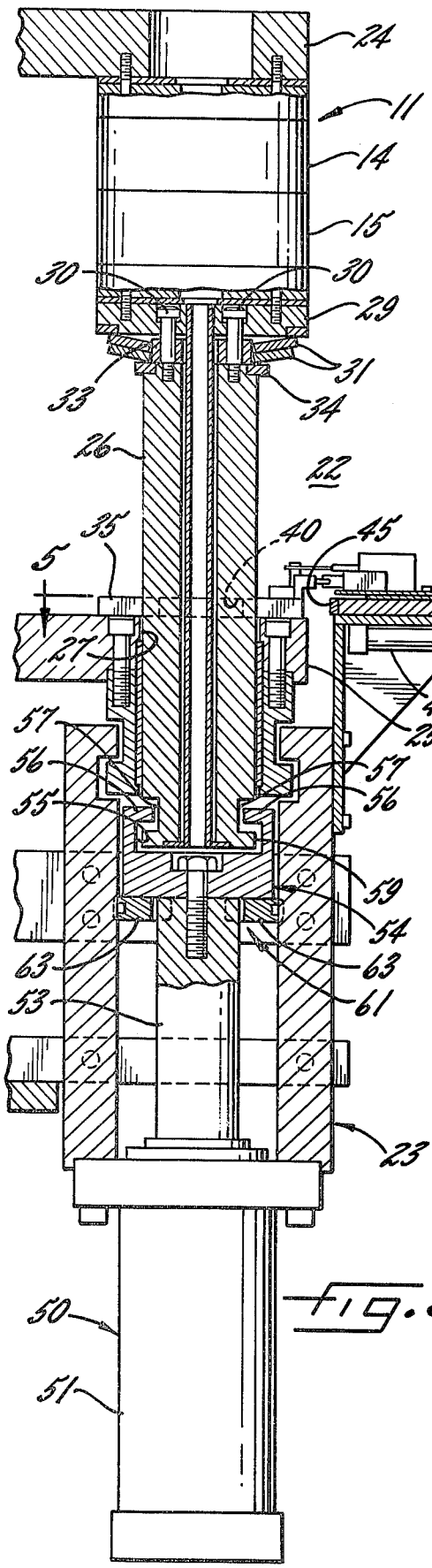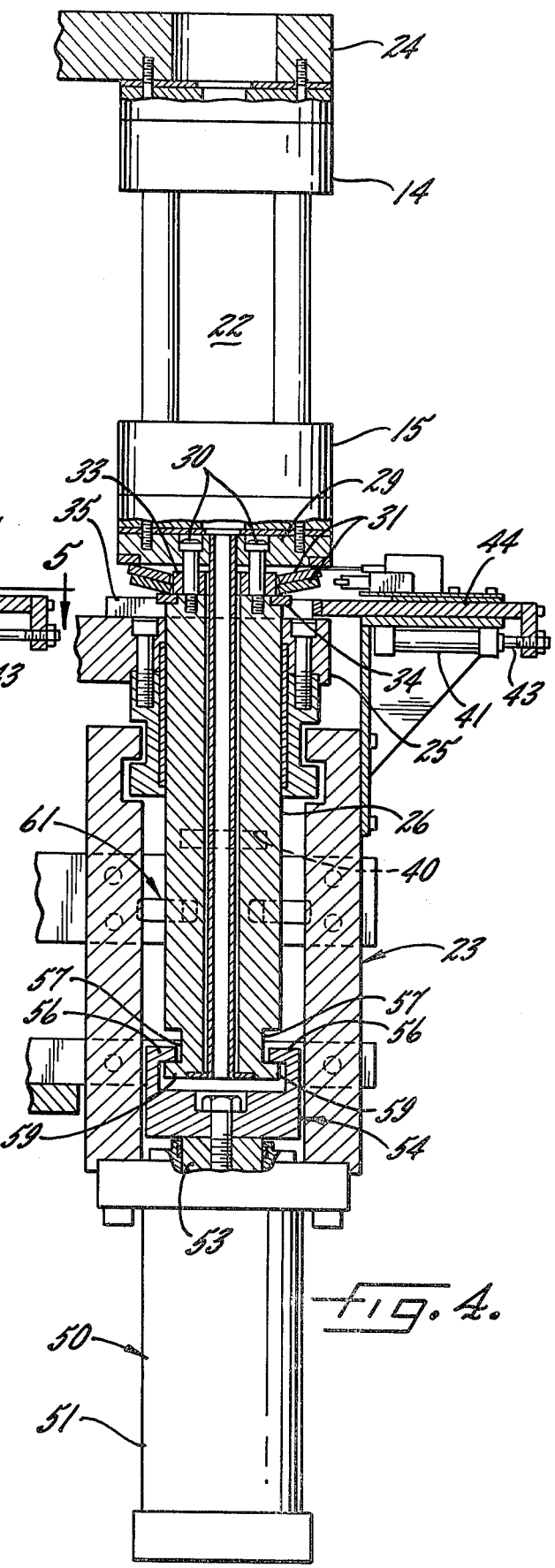

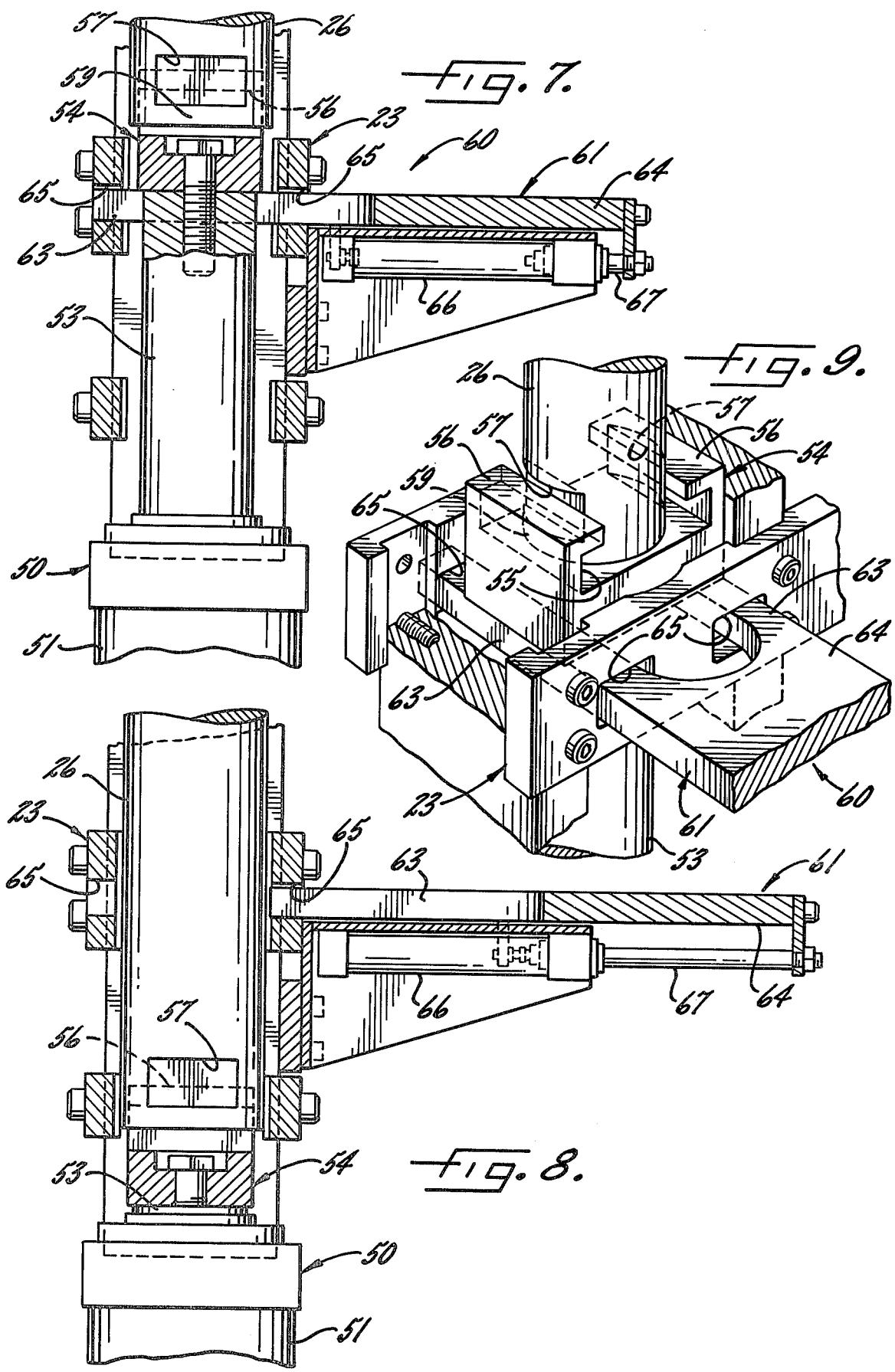

MECHANISM FOR OPENING THE MOLDING DIES OF AN INJECTION MOLDING MACHINE

BACKGROUND OF THE INVENTION

This invention relates to a molding machine in which several molding units having upper and lower molds are supported on a turret and are adapted to be indexed intermittently through a series of stations. One of the stations which each molding unit moves into and dwells in is an opening station where the lower mold is pulled downwardly from the upper mold to permit removal of the newly formed part from the molds.

In one prior molding machine of this general type, an hydraulic actuator is located in the opening station and is adapted to operate a vertically reciprocable puller for opening the molds of each molding unit. Each lower mold carries a depending operator which moves into a loose interfitting relationship with the puller as the molding unit is first rotated into the opening station. When the unit dwells, the hydraulic actuator is operated and shifts the puller in a downward direction to cause the puller to engage the operating member and move the lower mold downwardly from the upper mold.

The position which the puller occupies when the operating member of each molding unit moves into loose interfitting relation with the puller is neither the uppermost nor the lowermost limit position of the puller. Instead, the puller is located in an intermediate position and must be held in that position in order to avoid interference between the puller and the operating member of the unit being indexed into the opening station.

SUMMARY OF THE INVENTION

The general aim of the present invention is to provide an extremely simple and reliable mechanism for releasably holding the puller precisely in its intermediate position during indexing of the molding units, the mechanism eliminating the need for complex controls for the hydraulic actuator and enabling the use of a simpler and less expensive actuator.

A more detailed object is to achieve the foregoing by providing a unique stop which physically holds the puller in its intermediate position during indexing of the molding units and which may be easily released from the puller preparatory to the puller being actuated to open the molding units.

These and other objects and advantages of the invention will become more apparent from the following detailed description when taken in conjunction with the accompanying drawings.

BRIEF DESCRIPTION OF THE DRAWINGS

FIG. 3 is an enlarged fragmentary cross-section taken substantially along the line 3—3 of FIG. 2 and shows the lower mold in a closed position.

FIG. 4 is a view similar to FIG. 3 but shows the lower mold in an open position.

FIG. 7 is an enlarged fragmentary cross-section taken substantially along the line 7—7 of FIG. 2 and shows the latching stop extended.

FIG. 8 is a view similar to FIG. 7 but shows the latching stop retracted.

FIG. 9 is a fragmentary perspective view which primarily shows the puller and the latching stop.

DETAILED DESCRIPTION OF THE PREFERRED EMBODIMENT

Figure 2:
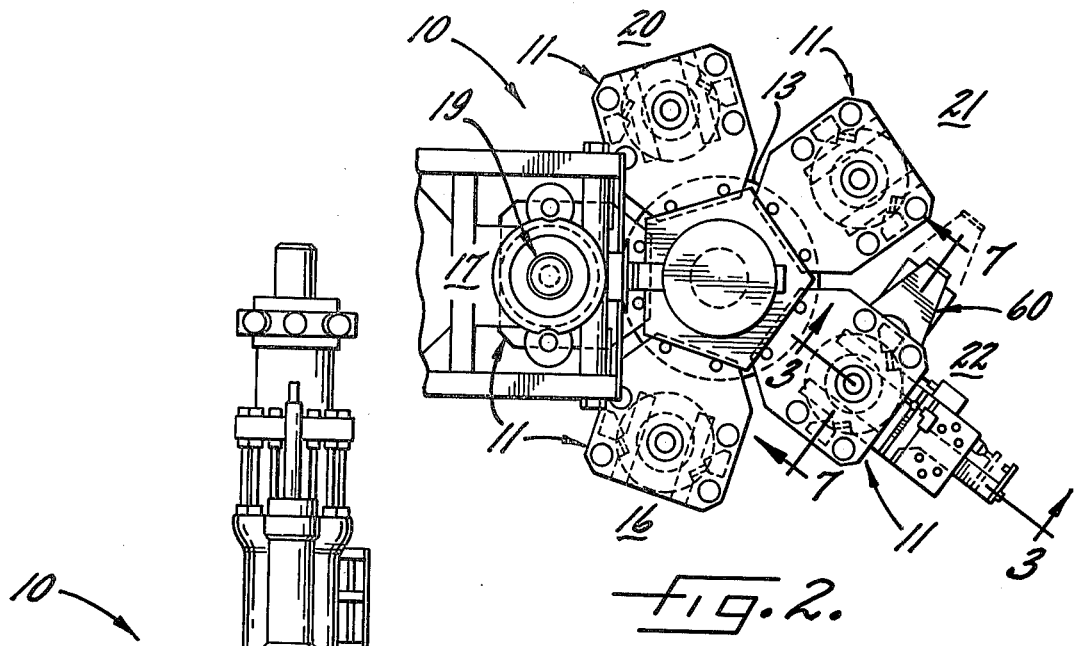
FIG. 2 is a fragmentary top plan view of the machine shown in FIG. 1.
Figure 1:
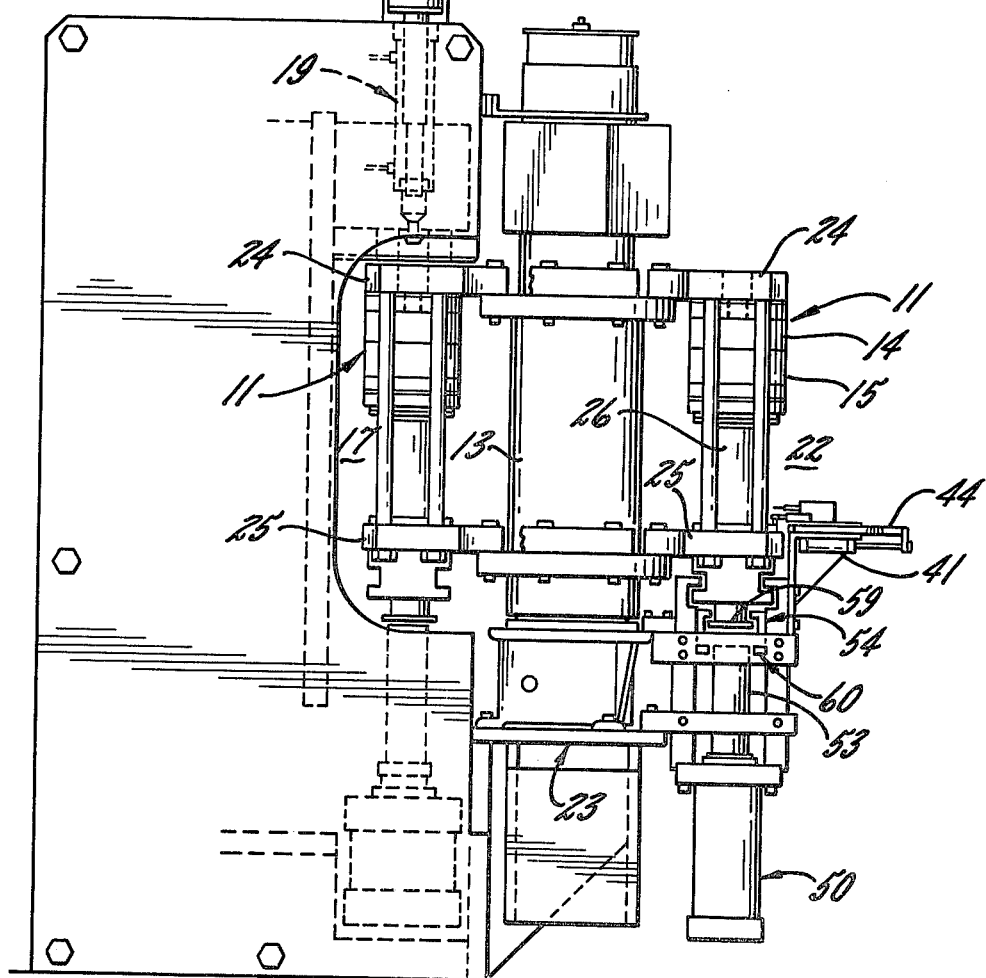
FIG. 1 is a side elevational view of a new and improved molding machine incorporating the unique features of the present invention.

As shown in the drawings for purposes of illustration, the invention is embodied in an injection molding machine 10 of the type in which several molding units 11 (there herein being five units) are supported on a turret 13 and are adapted to be indexed intermittently and about an upright axis through five angularly spaced stations. Each molding unit comprises upper and lower molds 14 and 15 (FIGS. 3 and 4) which may be opened and closed by shifting the lower mold downwardly away from and upwardly toward the upper mold.

During rotation of the turret 13, each molding unit 11 is indexed out of an idle station 16 (FIG. 2) while its molds 14 and 15 are closed and is indexed into a molding station 17 where an injector assembly 19 forces molding material into the molds as the latter dwell. Thereafter, each molding unit dwells in two curing stations 20 and 21 and then is indexed into and dwells at an opening station 22. While the unit is in this station, the lower mold 15 is pulled away from the upper mold 14 to enable the newly formed part to be removed from the molds. The molds then are closed preparatory to being indexed to the idle station 16.

More specifically, the turret 13 is rotatably mounted on a main support or frame which has been indicated in its entirety by the reference numeral 23. The upper mold 14 of each unit 11 is fixed rigidly to an upper bolster 24 (FIG. 3) which projects outwardly from the turret 13 while a somewhat similar lower bolster 25 also projects outwardly from the turret and underlies the lower mold 15.

To enable each lower mold 15 to be opened and closed with respect to its overlying upper mold 14, an operating member in the form of a vertical rod 26 (FIG. 3) projects upwardly through an opening 27 in the lower bolster 25. The upper end of the rod 26 is connected to a plate 29 on the underside of the lower mold by screws 30 which are threaded into the end of the rod and whose heads and shanks are slidably received in counterbored holes formed through the plate. Two Belleville springs 31 surround a collar 33 which is rigid with the upper end of the rod, the springs being loaded against the underside of the plate 29 and against a ring 34 on the upper end of the rod so as to urge the rod downwardly and to urge the lower mold upwardly. When the lower mold 15 is in contact with the upper mold 14, a small amount of vertical clearance exists between the lower side of the plate 29 and the upper end of the collar 33 as shown in FIG. 3.

Figure 5:
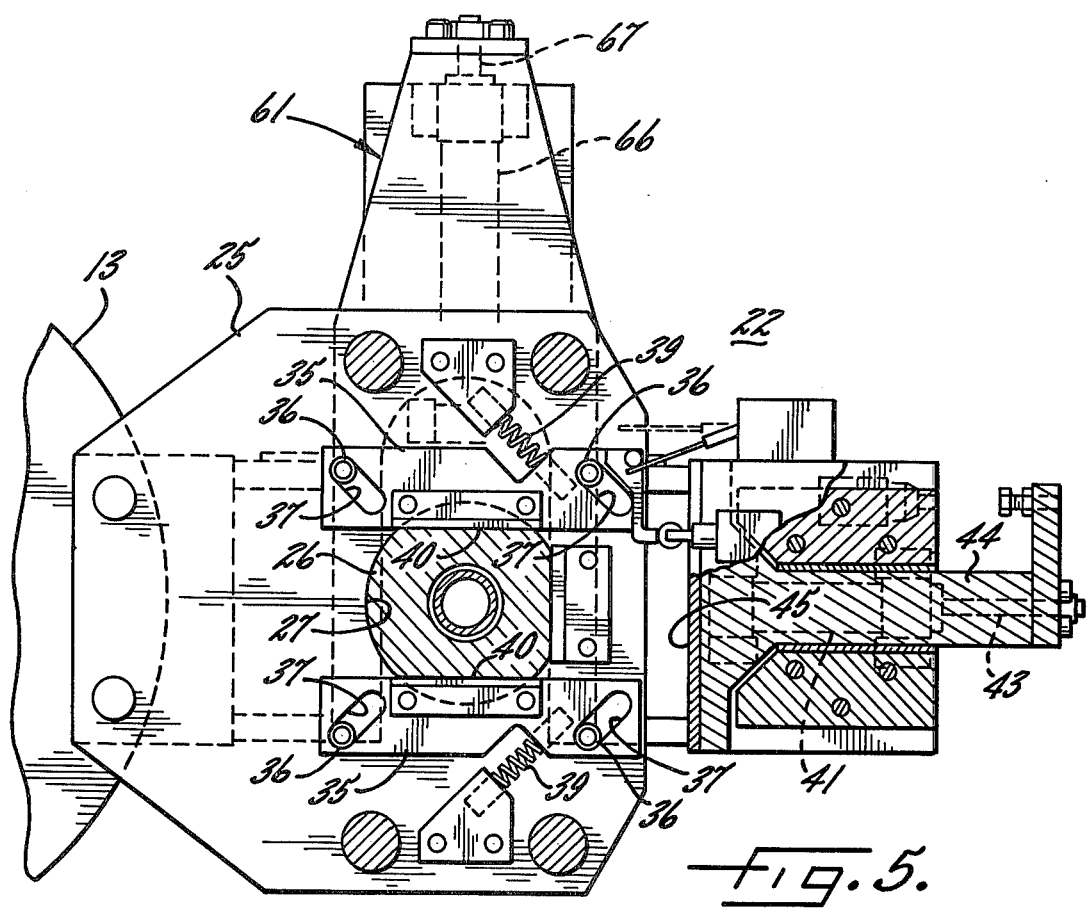
FIG. 5 is an enlarged fragmentary cross-section taken substantially along the line 5—5 of FIG. 3 and shows the latching stop extended and holding the puller in its intermediate position.

The operating rod 26 is adapted to be held in a position in which the lower mold 15 is closed against the upper mold 14. For this purpose, two latches 35 (FIG. 5) are supported slidably on the lower bolster 25 by means of pins 36 and inclined slots 37. Coil springs 39 are compressed between the bolster and the latches and urge the latter toward latched positions in which the inboard side edge portions of the latches are received within tangential slots 40 cut in the side of the rod 26. When the latches are disposed within the slots, the upper sides of the slots are urged downwardly against the latches by the Belleville springs 31 and a small amount of vertical clearance exists between the latches and the lower sides of the slots. When latched, the latches prevent the rod 26 and the lower mold 15 from being lowered from the position shown in FIG. 3 and thus the lower mold is held in contact with the upper mold 14.

To release the latches 35, an hydraulic cylinder 41 (FIGS. 3 and 5) is supported on the main frame 23 of the machine 10 and includes a horizontal rod 43 which is connected to a slide 44. The latter is guided for in and out sliding by the frame and carries a shoe 45 on its inner end. When the rod 43 of the cylinder 41 is retracted, the shoe 45 is moved inwardly into engagement with the outer ends of the latches 35 (see FIG. 6) and forces the latter to move inwardly. As the latches move inwardly, the pins 36 and the slots 37 cause the latches to shift in a lateral direction and thus the latches are retracted from the slots 40 in the rod 26. When the rod of the cylinder is extended, the shoe 45 is retracted away from the latches 35 to enable the springs 39 to shift the latches back to their latched positions within the slots 40 (see FIG. 5).

Opening and closing of the lower mold 15 of each unit 11 is effected by an hydraulic actuator 50 (FIG. 3) having a cylinder 51 which is fixed to the frame 23 and having an upwardly projecting rod 53 which is adapted to be reciprocated upwardly and downwardly when pressure fluid is alternately admitted into and dumped from opposite ends of the cylinder. A puller 54 is attached rigidly to the upper end of the cylinder rod 53 and is adapted to interfit loosely with the lower end of the operating rod 26 of each unit 11 when the latter is rotated into the opening station 22. For this purpose, the puller 54 is in the form of a block having a slot 55 (FIGS. 3 and 9) of T-shaped cross-section and having inwardly projecting ears or flanges 56 at its upper end. Tangentially extending slots 57 are formed on opposite sides of the lower end portion of the operating rod 26 and are located just above ears or flanges 59 which define the extreme lower end of the operating rod.

When each molding unit 11 is first rotated into the opening station 22, the lower mold 15 is latched in its closed position and the operating rod 26 of such mold is positioned as shown in FIG. 3 so that vertical clearance exists between the collar 33 on the upper end of the rod and the plate 29 on the lower side of the lower mold. In addition, the puller block 54 is located in an intermediate vertical position as shown in FIG. 3.

With the operating rod 26 and the puller block 54 of each unit 11 so positioned, the flanges 59 on the lower end of the operating rod may move loosely into the slot 55 in the puller block and into underlying relation with the flange 56 on the puller block. The latter flange also is received within the slots 57 in the operating rod 26. The various slots 55 and 57 and flanges 56 and 59 are sized such that clearance exists between the flanges and the walls of the slots and thus the operating member 26 remains out of rubbing contact with the puller block 54 as the molding unit 11 is rotated into the opening station 22.

Figure 6:
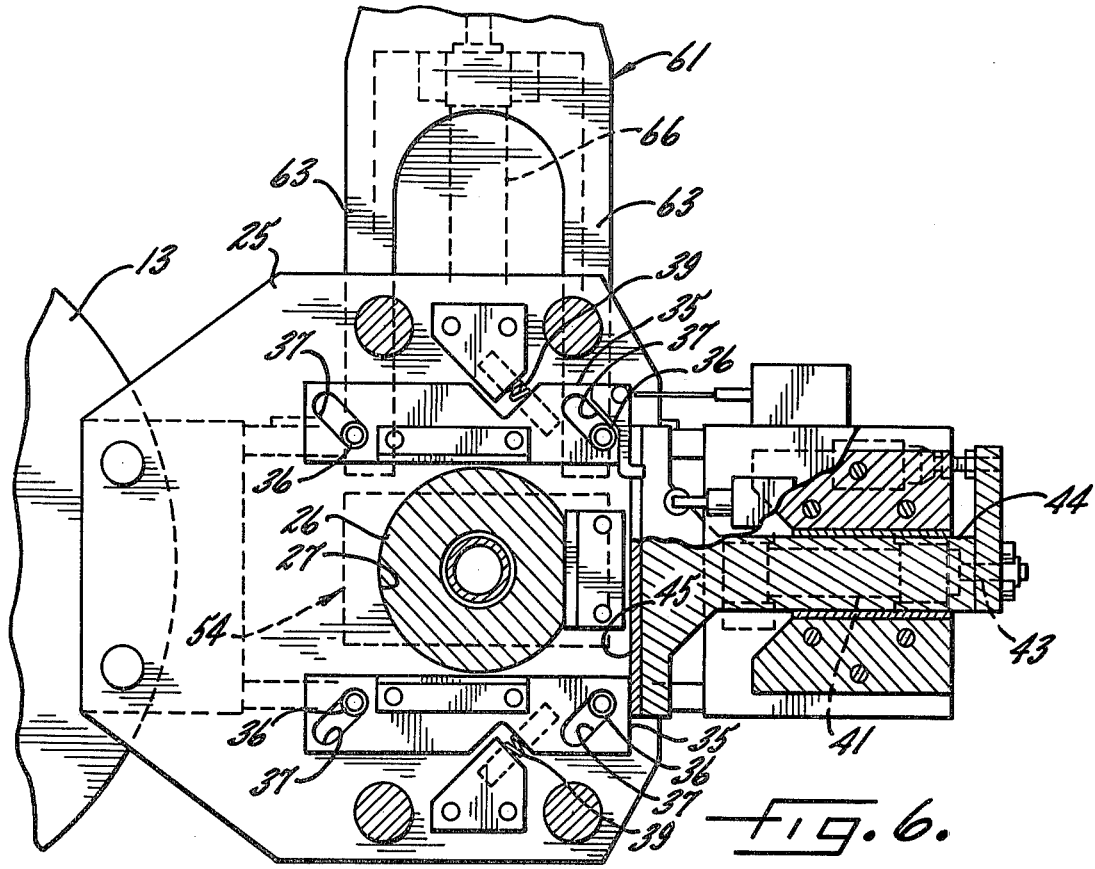
FIG. 6 is a view similar to FIG. 5 but shows the latching stop retracted.

When each molding unit 11 dwells in the opening station 22, the lower mold 15 is shifted to its open position shown in FIG. 4. This is achieved by first admitting pressure fluid into the lower end of the cylinder 51 to extend the rod 53 and to shift the puller block 54 upwardly from its intermediate position to an upper position (not shown). As the puller block is shifted upwardly, the bottom of the slot 55 moves into contact with the lower end of the operating rod 26 and shifts the latter upwardly to compress the Belleville springs 31, to take up the clearance between the collar 33 and the plate 29 and to lift the upper walls of the slots 40 off of the latches 35. Being free of downward pressure, the latches are capable of being released from the slots 40 and thus the cylinder 41 may be actuated to extend the shoe 45 and force the latches to their released positions as shown in FIG. 6. The latches are held in their released positions by the shoe until the lower mold 15 has been opened and then re-closed.

Once the latches 35 have been released, pressure fluid is admitted into the upper end of the cylinder 51 to retract the cylinder rod 53 and to move the puller block 54 downwardly from its upper position, past its intermediate position (FIG. 3) and to a lowered position shown in FIG. 4. As the puller block moves downwardly, the flange 57 engages the flanges 59 and then pulls the operating rod 26 downwardly through a considerable distance to open the lower mold (see FIG. 4) and permit removal of the newly formed part from the molds.

After the part has been removed, the lower mold 14 is closed before the molding unit 11 is indexed out of the opening station 22. Closing of the mold is effected by pressurizing the lower end of the cylinder 51 to raise the puller block 54 and to cause the bottom of the slot 55 to engage the lower end of the operating rod 26. The puller block is shifted upwardly from its lowered position shown in FIG. 4, past its intermediate position shown in FIG. 3 and to its upper position so as to shift the operating rod 26 upwardly until the lower mold 15 contacts the upper mold 14 and until the upper walls of the slots 40 are spaced above the latches 35. At this time, the rod 43 of the cylinder 41 is extended to release the shoe 45 from the latches 35 and to permit the latches to snap into the slots 40. The upper end of the cylinder 51 then is pressurized to lower the puller block 54 back to its intermediate position shown in FIG. 3 and, as the puller block lowers, the Belleville springs 31 shift the operating rod 26 downwardly a short distance until the upper walls of the slots 40 engage and press against the latches 35. With the lower mold 15 closed and with the puller block 54 in its intermediate position and loosely receiving the operating rod 26, the turret 13 may be indexed to rotate the empty molding unit 11 out of the opening station 22 and to rotate the next molding unit into that station.

Because the puller block 54 is located in its intermediate position when each molding unit 11 is indexed into and out of the opening station 22, the rod 53 of the hydraulic actuator 50 is neither at the uppermost limit nor the lowermost limit of its stroke during such indexing. In accordance with the present invention, provision is made of a unique stop mechanism 60 (FIGS. 7 and 9) which is capable of physically holding the puller block 54 precisely in its intermediate position during indexing of the molding units 11 so that the puller block may loosely receive and will not collide with the lower ends of the operating rods 26 of the molding units. By virtue of incorporating the stop mechanism 60 in the machine 10, the hydraulic actuator 50 may be of standard and comparatively inexpensive construction and does not require complex hydraulic controls for stopping the cylinder rod 53 at an intermediate point along its stroke.

Specifically, the stop mechanism 60 includes a releasable stop which herein is in the form of a substantially U-shaped yoke 61 (FIGS. 7 to 9) disposed in a horizontal plane and having a pair of spaced legs 63 interconnected by a bight portion 64. The yoke 61 is located at right angles relative to the latch release shoe 45 and is guided for sliding between an extended position (FIGS. 5, 7 and 9) and a retracted position (FIGS. 6 and 8) by openings 65 (FIGS. 7 and 9) in the main frame 23, the openings receiving the legs 63 of the yoke. To move the yoke between its positions, an hydraulic actuator 66 is attached to the frame and includes a horizontally reciprocable rod 67 which is connected to the outer end of the bight portion 64 of the yoke.

The upper surfaces of the legs 63 of the yoke 61 are disposed in the same horizontal plane which is occupied by the lower surface of the puller block 54 when the latter is in its intermediate position. In addition, the spacing between the legs is such that the legs straddle the cylinder rod 53 and underly the puller block when the puller block is in its intermediate position and the yoke is in its extended position (see FIGS. 3, 7 and 9). The extended yoke thus prevents the puller block from moving downwardly out of its intermediate position.

When each molding unit 11 is first indexed into the opening station 22, the yoke 61 is disposed in its extended position and thus underlies the puller block 54. At this time, the upper end of the cylinder 51 is pressurized and thus the cylinder constitutes means which bias the puller block downwardly against the yoke. Accordingly, the yoke prevents the puller block from moving downwardly from its intermediate position shown in FIG. 3 and, at the same time, the pressure in the upper end of the cylinder 51 prevents the block from moving upwardly out of its intermediate position. Thus, the block is held at a precisely established elevation and in a position to receive the lower end of the operating rod 26 without either colliding with or rubbing against the rod when the latter is indexed into the opening station 22.

Once the molding unit 11 has stopped in the opening station 22, the actuator 66 may be operated so as to extend its rod 67 and retract the yoke 61 from beneath the puller block 54 (see FIGS. 6 and 8). The lower end of the cylinder 51 then is pressurized to raise the operating rod 26 and permit release of the latches 35, the cylinder 41 is actuated to release the latches, and the upper end of the cylinder 51 is re-pressurized to cause the lower mold 15 to open (see FIG. 4). After the newly molded part has been removed, the lower end of the cylinder 51 is re-pressurized to close the lower mold and thereafter the cylinder 41 is actuated to allow the latches 35 to snap to their closed positions. The actuator 66 then is operated to retract its rod 67 and shift the yoke 61 back to its extended position. The upper end of the cylinder 51 then is pressurized to lower the puller block 54 into engagement with the extended yoke, the yoke stopping the block precisely in its intermediate position to enable the empty molding unit 11 to index freely out of the opening station 22 and to enable the next molding unit to rotate freely into the station.

From the foregoing, it will be apparent that the yoke 61 physically holds the puller block 54 in its intermediate position and avoids the need for employing hydraulic controls for stopping the cylinder rod 53 between the limits of its stroke. Accordingly, the yoke simplifies the molding machine 10 and increases its reliability.

I claim:

1. A molding machine comprising a fixed support, a turret mounted on said support and adapted to be indexed step-by-step about an upright axis, a series of molding units carried on and spaced angularly around said turret and each adapted to be rotated into and to dwell momentarily in an opening station during indexing of said turret, each of said molding units comprising upper and lower molds, the lower mold of each unit being disposed in a closed position relative to the upper mold when the unit is first rotated into said opening station and being moved downwardly to an open position relative to said upper mold when the unit dwells in said opening station, an operating member connected to and depending from the lower mold of each unit, a vertically reciprocable puller located on said support in said opening station, said puller being operable to interfit automatically with the operating member of each unit when the unit is rotated into said opening station and the puller is in a first position and being operable to engage said operating member and move said lower mold to said open position when the unit dwells and the puller is shifted downwardly to a second position, means for biasing said puller away from said first position as each unit is rotated into said opening station, a stop engageable with said puller when the latter is in said first position and operable to hold said puller precisely in said first position against the force exerted by said biasing means so as to keep said puller in position to interfit with the operating member of the unit being rotated into said opening station, and means for shifting said stop out of holding engagement with said puller when said unit dwells thereby to enable said puller to move out of said first position.

2. A molding machine as defined in claim 1 further comprising a vertical rod, said puller comprising a block attached to the upper end of said rod, said stop comprising a substantially U-shaped yoke having a pair of spaced legs, said yoke being mounted on said support to move between an extended position in which said legs straddle said rod and underlie said block and a retracted position in which said legs are withdrawn from beneath said block.

3. A molding machine as defined in claim 2 in which said shifting means comprise a fluid-operated actuator connected between said support and said yoke and operable to move the latter between said extended and retracted positions.

4. A molding machine comprising a fixed support, a turret mounted on said support and adapted to be indexed step-by-step about an upright axis, a series of molding units carried on and spaced angularly around said turret and each adapted to be rotated into and to dwell momentarily in an opening station during indexing of said turret, each of said molding units comprising upper and lower molds, the lower mold of each unit being disposed in a closed position relative to the upper mold when the unit is rotated into said opening station and being moved downwardly to an open position and then back upwardly to said closed position when the unit dwells in said opening station, an operating member connected to and depending from the lower mold of each unit, a puller located in said opening station, a fluid-operated actuator connected to said puller and operable to reciprocate the latter upwardly and downwardly, said puller being operable to interfit automatically with the operating member of each unit when the unit is rotated into said opening station and the puller is in an intermediate position, said actuator moving said puller upwardly from said intermediate position to an upper position during the initial dwell period of each unit in said opening station, moving said puller downwardly from said upper position, past said intermediate position and to a lower position during a first intermediate dwell period of each unit in said opening station, moving said puller upwardly from said lower position to said upper position during a second intermediate dwell period of each unit in said opening station, and moving said puller downwardly from said upper position to said intermediate position during the final dwell period of each unit in said opening station, said puller acting on the operating member of each unit to move the lower mold of the unit toward said open position as said puller is moved toward said lower position and to move the lower mold toward said closed position as said puller is moved from said lower position, said actuator forcing said puller downwardly from said intermediate position toward said lower position as each unit is rotated into said opening station, a stop engageable with said puller when the latter is in said intermediate position and operable to hold said puller precisely in said intermediate position against the downward force exerted by said actuator so as to keep said puller in position to interfit with the operating member of the unit being rotated into said opening station, means for retracting said stop out of holding engagement with said puller when said unit dwells thereby to enable said puller to move toward said lower position and open said lower mold, and said last-mentioned means extending said stop back into holding engagement with said puller after the puller has moved from said lower position to said upper position and has closed said lower mold and before said actuator returns said puller downwardly to said intermediate position.

5. A molding machine as defined in claim 4 in which one of said operating member and said puller is formmd with a slot having upper and lower sides and in which the other of said operating member and said puller is formed with an ear which is sized to fit into said slot, said ear being spaced from the sides of said slot when said puller is in said intermediate position.

* * * * *